(12) United States Patent
May

(10) Patent No.: US 11,204,615 B2
(45) Date of Patent: Dec. 21, 2021

(54) POWER SUPPLY CONTROL SYSTEM

(71) Applicant: Pirate Studios Limited, London (GB)

(72) Inventor: Robert May, London (GB)

(73) Assignee: Pirate Studios Limited, London (GB)

( * ) Notice: Subject to any disclaimer, the term of this patent is extended or adjusted under 35 U.S.C. 154(b) by 0 days.

(21) Appl. No.: 16/837,453

(22) Filed: Apr. 1, 2020

(65) Prior Publication Data

US 2020/0319660 A1 Oct. 8, 2020

(30) Foreign Application Priority Data

Apr. 2, 2019 (GB) ..................... 1904596

(51) Int. Cl.
*H02J 3/14* (2006.01)
*G05F 1/625* (2006.01)
*G06Q 10/02* (2012.01)
*H02J 4/00* (2006.01)

(52) U.S. Cl.
CPC ............. *G05F 1/625* (2013.01); *G06Q 10/02* (2013.01); *H02J 4/00* (2013.01)

(58) Field of Classification Search
CPC . G05F 1/625; G06Q 10/02; H02J 4/00; Y02D 30/50; H04L 12/12
USPC .......................................................... 307/31
See application file for complete search history.

(56) References Cited

U.S. PATENT DOCUMENTS

| | | | | |
|---|---|---|---|---|
| 2014/0180486 A1* | 6/2014 | Newman, Jr. | ........... | G06F 1/325 700/295 |
| 2015/0179012 A1* | 6/2015 | Sharpe | ................ | G06F 3/04842 340/5.28 |
| 2019/0012614 A1* | 1/2019 | Yamada | ................ | G06Q 10/02 |

FOREIGN PATENT DOCUMENTS

EP         3629258 A1      4/2020

OTHER PUBLICATIONS

European Extended Search Report, Application No. 20167587.3, dated Jul. 8, 2020.

* cited by examiner

*Primary Examiner* — Ryan Jager
(74) *Attorney, Agent, or Firm* — MacMillan, Sobanski & Todd, LLC

(57) ABSTRACT

A power supply control system includes a power supply controller configured to selectively supply electrical power to a venue; and a booking controller located remotely from the venue, the booking controller configured to maintain third party booking information, wherein the power supply controller is configured to control the supply of electrical power based on the third party booking information. A power supply controller and booking controller for the power supply control system are also provided.

17 Claims, 2 Drawing Sheets

POWER SUPPLY CONTROL SYSTEM

BACKGROUND OF THE INVENTION

The present disclosure relates to a power supply control system for controlling the supply of power to a venue and is particularly, although not exclusively, concerned with a power supply control system for controlling the supply of power to a recording studio or rehearsal space.

Venues, such as music rehearsal spaces and recording studios, typically comprise a large number of electrical devices, such as amplifiers, preamplifiers, digital audio workstation devices, lighting and power suppliers for electrical items, such as instruments, being users by occupants of the venue.

These electrical devices can use large amounts of energy while switched on and being used, as well as while left on stand-by or not currently being used, e.g. to amplify or record music. It is therefore desirable for electrical devices within the venue to be powered down when the venue is not in use.

SUMMARY OF THE INVENTION

According to an aspect of the present disclosure, there is provided a power supply controller for selectively providing power to a venue, wherein the power supply controller comprises one or more modules configured to: communicate with a booking controller located remotely from the venue to request power supply information, e.g. current power supply information; and control the supply of power to the venue, e.g. to one or more electrical devices at the venue, on receiving the power supply information in response to the request.

The power supply information may comprise an indication of whether power should or should not be supplied to the electrical devices, e.g. at the present time. Additionally or alternatively, the power supply information may be an indication of when, e.g. how long until, power should be supplied to the electrical devices. A relay module of the power supply controller may be configured to adjust the supply of power to the electrical devices if the power supply information differs from power supply information received previously, e.g. according to the newly received power supply information.

If the power supply information indicates that power should be supplied, the relay module may operate to supply power and if the power supply information indicates that power should not be supplied, the relay module may operate to prevent power being supplied.

The power supply controller may apply the received power supply information to control the supply of power to the electrical devices when, e.g. at the time that, the power supply information is received. The power supply controller may control the supply of power to the electrical devices in response to receiving the power supply information.

The power supply controller may be further configured to transmit information identifying the venue and/or the power supply controller to the booking controller in order to request the power supply information.

The power supply controller may be configured to request the power supply information repeatedly at a predetermined frequency, e.g. at a frequency of once a minute.

The power supply controller may be configured to supply power to a first group of electrical devices at the venue when the power supply information indicates that power should be supplied or that power should be supplied within a first period of time. For example, if the power supply information indicates that power should be supplied in 15 minute or less, the first group of electrical devices may be provided with electrical power, e.g. so that the first group of electrical devices can warm up.

The power supply controller may be configured to supply power to a second group of electrical devices when, e.g. only when the power supply information indicates that power should currently be supplied. The power supply controller may be configured to continue supplying power to a third group of electrical devices after the power supply information indicates that power should no longer be supplied. For example, power may continue being supplied to lights and/or one or more safety devices provided at the venue.

The power supply controller may be configured to stop supplying power to a fourth group of electrical devices when the power supply information indicates that power should no longer be supplied, e.g. after the power supply information has previously indicated that power should be supplied. In other words, the power supply controller may be configured to cut power to the fourth group of electrical device in response to receiving power supply information indicating that power should no longer be supplied.

The power supply controller may further comprise a low voltage circuit and a high voltage contactor controllable by the low voltage circuit to supply electrical power to the venue. The relay module of the power supply controller may be configured to control the operation of the low voltage circuit.

The power supply controller may further comprise an occupant sensor configured to determine whether one or more occupants are at, e.g. present within, the venue. The power supply controller may be configured to control the supply of electrical power based on the power supply information and whether one or more occupants are at the venue. For example, power may be supplied to one or more of the electrical devices when the power supply information indicates that power should be supplied and one or more occupants are present at the venue. Furthermore, power may be supplied to a fifth group of electrical devices after power supply information indicates that power should no longer be supplied if one or more occupants are present within the venue.

The power supply controller may be further configured to control access to the venue based on the power supply information. For example, if the power supply information indicates that power should be supplied to the venue, access may be granted to the venue. If the power supply information indicates that power should not be supplied to the venue, access may not be granted for users to enter the venue. Alternatively, if the power supply information indicates that power should not be supplied to the venue, access may not be granted if no occupants are present, e.g. already present, within the venue. The power supply controller may control the supply of power to an access controller and/or may communicate with the access controller to control access to the venue.

The power supply controller may be configured to supply power to the venue if no power supply information is received from the booking controller, e.g. in response to the request for power supply information.

The power supply controller may be configured to notify an occupant at the venue when the power supply information indicates that power should no longer be supplied after a further predetermined period of time has elapsed. For example, the power supply controller may notify occupants at the venue if the power supply information indicates that power should no longer be supplied after 15 minutes has elapsed.

The power supply controller may be configured to stop supplying power to a plurality of electrical devices at the venue in a predetermined shut down order when the power supply information indicates that power should no longer be supplied.

The venue may be a recording studio or rehearsal space. The electrical devices at the venue may comprise one or more audio production and/or recording devices, such as amplifiers, preamplifiers, and a digital audio workstation device.

According to another aspect of the present disclosure there, is provided a booking controller comprising one or more modules configured to: store third party booking information relating to one or more venues within a memory associated with the booking controller; receive a request for power supply information from a power supply controller at one of the venues; determine, based on the third party booking information, whether power should be supplied to electrical devices at the one of the venues; and transmit power supply information to the power supply controller, the power supply information indicating whether power should be supplied.

The booking controller may be configured to receive a venue booking request from a third party and store third party booking information corresponding to the venue booking request, e.g. within the memory associated with the booking controller. The venue booking request may indicate a time and duration of a booking to be made at the venue by the third party. The booking request may comprise information identifying a user who has made the booking request or who the booking has been made for.

According to another aspect of the present disclosure there is provided a power supply control system comprising: a power supply controller configured to selectively supply electrical power to a venue, e.g. to one or more electrical devices at the venue; and a booking controller located remotely from the venue, the booking controller configured to maintain third party booking information, wherein the power supply controller is configured to control the supply of electrical power based on the third party booking information.

The power supply controller may be located at the venue. The system may further comprise a further power supply controller configured to selectively supply electrical power to a further venue. The further power supply controller may be located at the further venue. The further power supply controller may be configured to control the supply of electrical power to electrical devices at the further venue based on the third party booking information.

The power supply controller and/or the further power supply controller may comprise the above-mentioned power supply controller. Additionally or alternatively, the booking controller may comprise the above-mentioned booking controller.

According to another aspect of the present disclosure, there is provided a power supply control system comprising: a power module configured to supply electrical power to a venue; and a booking system operatively connected to the power module, wherein the operation of the power module is dependent on a third party booking maintained on the booking system.

According to another aspect of the present disclosure there is provided a method of controlling the supply of power to a venue, the method comprising: requesting, by a power supply controller, power supply information from a booking controller located remotely from the venue; receiving the power supply information at the power supply controller; and controlling the supply of power to the venue on receiving the power supply information.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
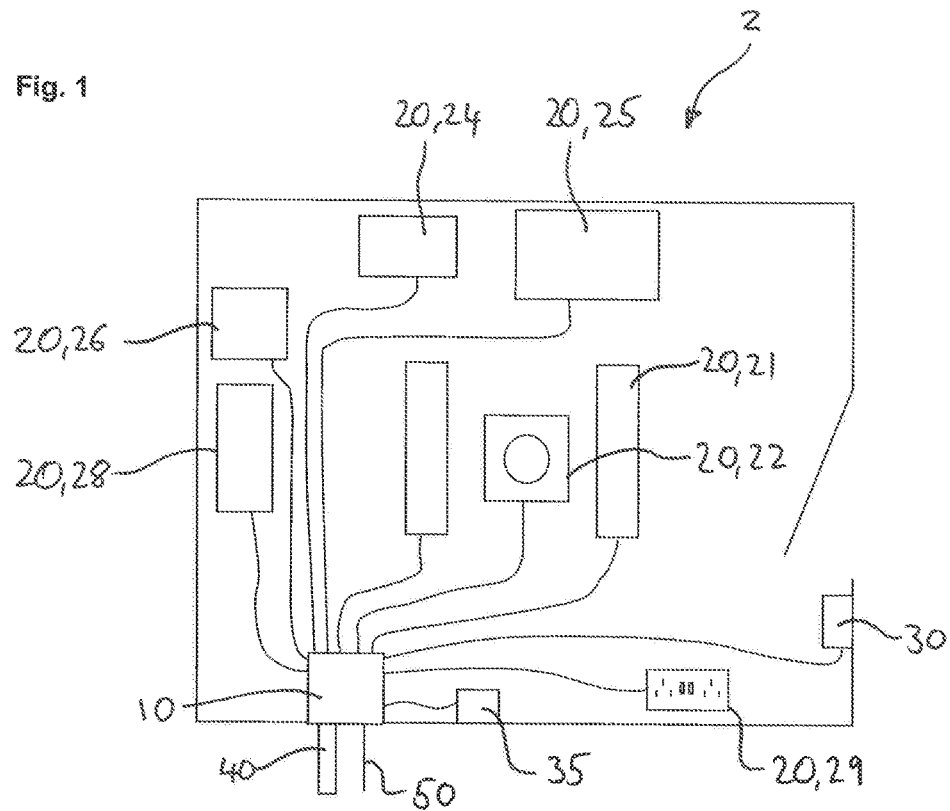
FIG. 1 is a schematic view of a venue comprising a power supply controller according to the present disclosure.

With reference to FIG. 1, a venue 2, such as a recording studio or rehearsal space comprises a power supply controller 10 and a plurality of electrical devices 20. The venue 2 may further comprise an access controller 30. An electrical supply line 40 is provided for supplying electrical power to the venue 2, e.g. to the electrical devices 20 within the venue 2.

In the arrangement depicted, the electrical devices 20 comprise lights 21, a heating, ventilation and air conditioning system 22, audio production and recording equipment, such as a pre-amplifier 24, an amplifier 25, a mixer 26, and a digital audio workstation device 28. The plurality of electrical devices 20 further comprise one or more power supplies 29, e.g. electrical outlets, to which users of the venue 2 can connect their own electrical devices to receive power.

In other arrangements, the venue 2 may comprise any additional or alternative electrical devices are desired. Alternatively, one or more of the electrical devices mentioned above may be omitted.

In the arrangement shown in FIG. 1, the venue 2 is an unmanned venue. The venue 2 can be booked by users of the venue and used without an operator being present to grant the access to the venue 2, or to switch on or provide power to the electrical devices 20.

When the users leave the venue 2, e.g. at the end of their booking, any electrical devices that are left switched on, or on standby, may continue consuming electrical power, which increases the operating costs of the venue 2. Furthermore, because the venue 2 is unmanned, users may arrive at the venue before their booking begins or stay at the venue 2 after their booking has ended, and may attempt to use power consuming devices before or after the period of time they have booked.

In order to prevent electrical power being consumed outside of the time period booked by a user, the power supply controller 10 is configured to control the supply of power to the venue 2, e.g. to one or more of the electrical devices 20 within the venue.

As depicted in FIG. 1, the power supply controller 10 is operatively connected to the electrical supply line 40. As described below, the power supply controller 10 is configured to receive power supply information via a communication link 50, e.g. a network communication link, and control the supply of electrical power from the electrical supply line 40 to the venue 2 at least partially based on the power supply information.

In some arrangements, the venue 2 may comprise one or more occupant sensors 35 configured to detect the presence of users within the venue 2. The occupant sensors 35 may form part of the power supply controller 10 or may be provided within the venue 2 separately from the power supply controller 10. The power supply controller 10 may receive occupant information from the occupant sensors 35 and be configured to control the supply of electrical power to the venue at least partially based on the occupant information.

The access controller 30 may be configured to control access to the venue 2, e.g. by locking or unlocking a door to the venue, or enabling the door to be unlocked by a user, e.g. by entering an access code.

The power supply controller 10 may be configured to supply power to the access controller 30. The power supplied to the access controller 30 may enable the access controller to operate to control access to the venue 2. The power supply controller 10 may supply power to the access controller 30 selectively, e.g. according to whether the venue 2 is booked. Alternatively, the power supply controller 10 may supply power to the access controller 30 substantially constantly.

In some arrangements, the power supply controller 10 may provide information to the access controller 30 indicating whether the venue 2 is booked and the access controller 30 may operate to unlock the door to the venue 2 or permit a user to unlock the door when the venue is booked.

The access controller 30 may not permit users to unlock the door when the venue is not booked, e.g. at times a booking has not been made for. In some arrangements, the access controller 30 may permit the door to be unlocked when the venue is not booked if occupants are present within the venue 2.

Figure 2:
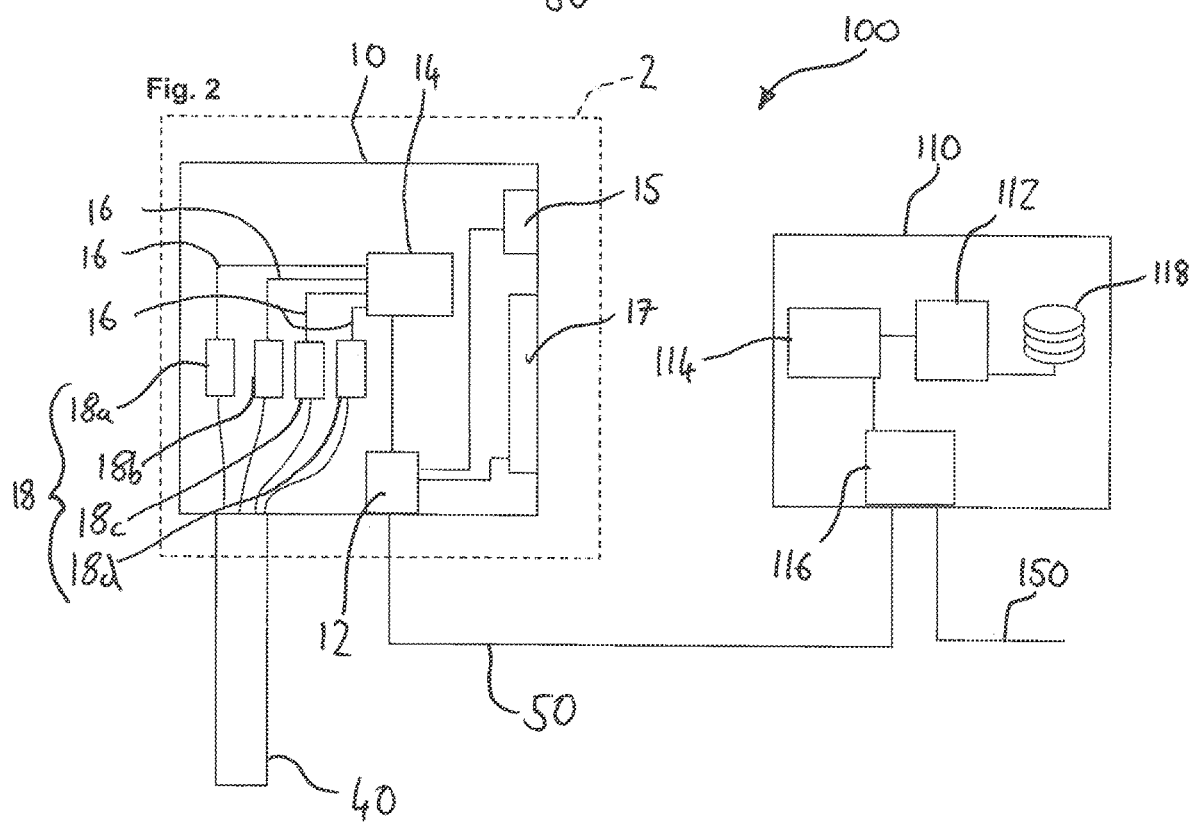
FIG. 2 is a schematic view of a power supply control system according to arrangements of the present disclosure.

With reference to FIG. 2, the power supply controller 10 operates within a power supply control system 100 in order to control the supply of power to the venue. The power supply control system 100 comprises the power supply controller 10 and a booking controller 110.

As depicted, the power supply controller 10 may be located at the venue 2. The booking controller 110 is located remotely from the venue 2. For example, the booking controller 110 may be located at a remote data center. The power supply controller 10 and the booking controller 110 are communicatively coupled via the communication link 50.

The communication link 50 may comprise a local or wide area network connection, e.g. via a network cable and/or a telephone line. Additionally or alternatively, the communication link 50 may comprise a wireless connection, such as a WiFi connection. In some arrangements, the communication link 50 may be facilitated by one or more further network devices, such as network switches, routers and/or modems (not shown).

The booking controller 110 may be coupled to a further communication link 150, such as a network or internet connection, and may be configured to receive communications from users and prospective users of the venue 2 via the further communication link 150. Alternatively, the booking controller may receive the communication from users and prospective users via the communication link 50, e.g. if the communication link 50 is facilitated via the internet.

As depicted in FIG. 2, the power supply controller 10 may comprise a communication module 12 and a relay module 14. The communication module 12 is operatively coupled to the communication link 50. The communication module 12 is configured to communicate with the booking controller 110 to request power supply information, e.g. via the communication link 50. For example, the communication module 12 may request the power supply information by transmitting identification information, e.g. a unique identification number, to the booking controller 110. The identification information may uniquely identify the power supply controller 10 and/or the venue 2.

The communication module 12 is further configured to receive power supply information from the booking controller 110 via the communication link 50, e.g. received in response to the request made by the communication module. The communication module 12 is configured to control the operation of the relay module 14 based on the power supply information.

The power supply information may comprise an indication of whether power should or should not be supplied to the electrical devices, e.g. at the present time. In other words, the power supply information may comprise an indication of whether the venue is currently booked by a user.

Additionally or alternatively, the power supply information may comprise an indication of when, e.g. how long until, power should be supplied to the electrical devices. For example, the power supply information may comprise an indication of how long remains until the next user booking beings.

Similarly, the power supply information may comprise an indication how long until a current user booking ends. In some arrangements, the power supply information may comprise information defining the start and end times of a current or future booking to enable the power supply controller 10 to calculate how long until a booking begins and/or ends.

In some arrangements, the power supply information may comprise information identifying a user who has made a current or future booking.

As depicted in FIG. 2, the relay module 14 is configured to control the operation of one or more low voltage circuits 16 of the power supply controller 10. The low voltage circuits 16 may operate at a lower voltage than the voltage supplied by the electrical supply line 40.

The power supply controller 10 further comprises one or more high voltage contactors 18, controllable by corresponding ones of the low voltage circuits 16. The high voltage contactors 18 are controllable to electrically connect, or disconnect, the electrical supply line 40 to, or from, the venue 2, e.g. the electrical devices 20 within the venue.

In other arrangements, the power supply controller 10 may not comprise the low voltage circuits 16 and the high voltage contactors 18, and the relay module 14 may directly control the supply of power from the electrical supply line 40 to the venue 2.

In the arrangement shown in FIG. 2, the power supply controller 10 comprises four high voltage contactors 18 configured to control the supply of power to different ones of the electrical components within the venue 2 respectively.

In particular, a first high voltage contactor 18a may be configured to control the supply to power to the heating, ventilation and air conditioning system 22; a second high voltage contactor 18b may be configured to control the supply of power to the audio production and recording equipment; a third high voltage contactor 18c may be configured to control the supply of power to the one or more power supplies 29; and a fourth high voltage contactor 18c may be configured to control the supply of power to the lights 21. However, in other arrangements, the power supply controller 10 may comprise any other desirable number of high voltage contactors. For example, the power supply controller 10 may comprise a single high voltage contactor that controls the supply of power to all of the electrical devices within the venue. Alternatively, the power supply controller 10 may comprise a high voltage contactor for each of the electrical devices 20 within the venue 2.

The communication module 12 may be configured to request the power supply information from the booking controller 110 repeatedly at a predetermined frequency. For example, the communication module 12 may request power supply information once every minute.

The communication module 12 is configured to control the operation of the relay module 14 according to the power supply information. For example, if the communication module 12 receives power supply information that differs from the power supply information received in response to the previous request, the communication module 12 controls the operation of the relay module 14 accordingly, e.g. to begin providing electrical power to the venue or one or more electrical devices within the venue 2, or to stop providing electrical power to the venue or one or more electrical devices within the venue.

The communication module 12 may be configured to control the operation of the relay module 14 to operate different ones of the low voltage circuits 16 depending on the power supply information received from the booking controller 110. For example, the communication module 12 may control the operation of the relay module 14 to operate different ones of the low voltage circuits 16 depending on whether the venue 2 is currently booked by a user, is booked for a time in the future or is no longer booked by a user.

In one or more arrangements of the disclosure, the communication module 12 is configured to control the relay module 14 to provide power to a first group of electrical devices when the power supply information indicates that the venue is currently booked by a user, and hence, power should currently be supplied to the venue 2. The communication module 12 may be configured to control the relay module 14 to provide power to the first group of electrical components if the power supply information indicates that a booking of the venue 2 begins within a first predetermined period of time. For example, if a booking is scheduled to begin within 15 minutes, power may be provided to the first group of components.

The first group of electrical devices may comprise the heating, ventilation and air conditioning system 22. By beginning to supplying power to the heating, ventilation and air conditioning system 22 at a time before the start of the booking, the venue 2 may be brought to a suitable temperature at the time the booking begins. In some arrangements, the first group of devices may comprise the lights 21. Supplying power to the lights 21 before the start of the booking ensures that the venue 2 is well lit when the users arrive at the venue 2 and may allow the users of the venue 2 to set-up any equipment, particularly non-electrical equipment, within the venue 2 before the start of their booking.

When the venue comprises the access controller 30, the power supply controller 10 may be configured to supply power to the access controller 30 together with the first group electrical components. Additionally or alternatively, power supply controller 10 may send a signal to the access controller 30 indicating that the door to the venue 2 may be unlocked when power is supplied to the first group of electrical devices. In other words, the power supply controller 10 may provide power and/or may send a signal to the access controller 30 to allow access to be granted to the venue when the power supply information indicates that the venue 2 is currently booked by a user, or if the power supply information indicates that a booking of the venue begins within a predetermined period of time. Alternatively, the power supply controller 10 may be configured to supply power to the access controller 30 and/or send the signal to the access controller 30 indicating that access may be granted to the venue 2 when, e.g. only when, the power supply information indicates that the venue 2 is currently booked.

When the power supply information comprises information identifying the user that has made the booking or that the booking has been made for, the power supply controller 10 may transmit information to the access controller 30 identifying the user, and the access controller 30 may only permit the identifier user to access the venue 2. For example, the access controller 30 may unlock the door to the venue 2 when the user enters their personal access code.

The communication module 12 may be configured to control the operation of the relay module 14 to provide power to a second group of electrical devices when, e.g. only when, the power supply information indicates that the venue 2 is currently booked by a user. The second group of components may comprise the audio production and recording equipment and may comprise the electrical power supplies 29. By supplying power to the audio production and recording equipment only during the booked time, the user may not continue using the venue 2 for rehearsing and/or recording music before or after their booked time period.

In some arrangements, the power supply controller 10 may be configured to begin supplying power to electrical devices within the first and/or second groups of electrical devices when the access controller 30 is operated by a user to unlock the door to the venue. Additionally or alternatively, when the venue 2 comprises the occupant sensors 35, the power supply controller 10 may be configured to begin supplying power to one or more of the electrical devices within the first and/or second group of electrical devices when occupants are detected within the venue 2. For example, the power supply controller may begin supplying power to the lights 21 and/or the audio production and recording equipment when the door is unlocked or when occupants are detected within the venue 2.

The communication module 12 may be configured to control the operation of the relay module 14 to continue providing power to a third group of electrical devices after the power supply information indicates that the venue 2 is no longer booked by a user. For example, power may continue being supplied to safety equipment at the venue and/or the lights 21 after the booked time has ended. In some arrangements, power may continue being supplied to the third group of electrical devices for a second predetermined period of time after the end of a booking. For example, power may continue being supplied to the lights for a period of 30 minutes after the booking has ended.

When the venue 2 comprises the occupant sensors 35, the power supply controller 10 may be configured to continue supplying power to the third group of electrical devices whilst occupant information received from the occupant sensor indicates that users are present within the venue 2.

The communication module 12 may be configured to control the operation of the relay module 14 to stop providing power to a fourth group of electrical devices after the power supply information indicates that the venue 2 is no longer booked by a user.

The fourth group of components may comprise the audio production and recording equipment. The power supply controller 10 may be configured to stop providing power to the electrical devices in the fourth group of electrical devices in a predetermined order. For example, power may be cut the pre-amplifiers and amplifiers before the mixer and the digital audio workstation device.

When the venue 2 comprises the occupant sensors 35, the power supply controller 10 may be configured to supply power to a fifth group of electrical devices when one or more occupants are within the venue 2, e.g. when the occupant information from the occupant sensors 35 indicates that one or more occupants are inside the venue 2. The fifth group of electrical devices may comprise the lights 21 and safety equipment provided at the venue. The power supply controller 10 may be configured to supply power to the fifth group of electrical devices regardless of the power supply information, e.g. even when the power supply information indicates that power should no longer be supplied to the venue 2 because a booking has ended.

The power supply controller 10 may further comprise an occupant notification module 15. The occupant notification module 15 is configured to notify occupants at the venue when the power supply information indicates that power should no longer be supplied after a third predetermined period of time has elapsed. For example, the occupant notification module may notify occupants at the venue if the power supply information indicates that power should no longer be supplied after 15 minutes has elapsed.

A light or display screen, may be provided on the power supply controller 10 or inside the venue, which is controlled by the occupant notification module 15 to become illuminated or to display a message to the occupant when the power supply information indicates that power should no longer be supplied after the third predetermined period of time has elapsed.

On receiving the notification that the booking will shortly end, the occupant of the venue 2 may wish to extend their booking. In some arrangements, the power supply controller 10 may comprise a user interface 17 which can be operated by the occupant at the venue to extend an existing booking or create a new booking. The power supply controller 10 may transmit details of the new or extended booking to the booking controller 110 to be stored, as described below.

If the communication module 12 does not receive power supply information, or the power supply controller 10 detects an error in the power supply information received or in the operation of the power supply control system 100, the relay module 14 may be controlled to provide power to the venue 2, e.g. to a seventh group of electrical devices within the venue. The seventh group of electrical devices may comprise the lights, the heating, ventilation and air conditioning system. In some arrangements, the seventh group of electrical devices may comprise substantially all of the electrical device provided within the venue. In this way, a user's booking may not be interrupted or prevented from starting on time because of power being cut due to an error.

When the communication module 12 does not receive power supply information, or the power supply controller 10 detects an error in the power supply information received or the operation of the power supply control system 100, power may be supplied to the access controller 30 and/or the access controller may be instructed to permit access to the venue 2. In some arrangements, the access controller 30 may be controlled to unlock the door to the venue 2 if an error is detected.

It will be appreciated that each of the electrical devices 20 may be within a plurality of the groups of electrical devices described above, e.g. so that power is supplied to them by the power supply controller 10 in a desired way. For example, one of the electrical devices 20 may be in the first, third and seventh groups of electrical devices.

Although in the arrangement shown in FIG. 1, each of the electrical device within the venue is connected to the electrical supply line 40 by the power supply controller 10, in other arrangements, one or more electrical device provided at the venue may be directly connected to the electrical supply line, e.g. bypassing the power supply controller, such that the electrical device are supplied with power permanently, e.g. independently of the operation of the power supply controller 10.

The booking controller 110 may comprise a memory module 112, a control module 114 and a communication module 116. The memory module 112 may be configured to store third party booking information relating to one or more venues. The memory module 112 may comprise a memory, e.g. a storage medium, for storing the third party booking information. Alternatively, as depicted in FIG. 2, the memory module 112 may be configured to store the third party booking information in a memory 118 associated with, e.g. accessible to, the memory module 112. As depicted in FIG. 2, the memory 118 is provided as part of the third party booking controller 110. However, in other arrangements, the memory 118 may be separate from and operatively connected to the booking controller 110.

The third party booking information may comprise information defining the times at which users have booked particular venues. The third party booking information may further comprise information identifying the user who has booked the venue or who the booking has been made for, such as an identification number or user name of the user.

The communication module 116 may be configured to facilitate communications between the power supply controller 10 and the booking controller 110, e.g. via the communication link 50. In one arrangement, the communication module 116 is configured to operate a server-side Application Programming Interface (API) which enables the power supply controller 10 to communicate with the booking controller 110 to request power supply information.

The booking controller 110 may be configured to generate the power supply information based on the third party booking information stored by the memory module 112 in response to the request from the power supply controller 10. The booking controller 110 may transmit the generated power supply information to the power supply controller 10. For example, the booking controller 110 may be configured to determine, based on the third party booking information, whether power should currently be supplied to the venue 2, and generate the power supply information indicating whether power should currently be supplied.

The communication module 116 may be further configured to receive communications from users via the further communication link 150. The communications from users may comprise third party booking information input by the users, and the booking controller, e.g. the memory module 112, may store the third party booking information.

In some arrangements, the booking controller 110 is configured to host a website which can be accessed by users, e.g. via the internet, to input booking information. Alternatively, the website may be hosted by a separate webserver, which may transmit the booking information input by users to the booking controller 110 via the further communication link 150.

As described above, in some arrangements the power supply controller 10 may be configured to transmit details of a booking which has been extended or created via the user interface 17 of the power supply controller to the booking controller 110. The booking controller 110 may be configured to receive the details of the booking from the power supply controller 10 and store the details of the booking in the memory 118 as third party booking information.

In the arrangement shown in FIG. 2, the power supply control system 100 comprises a single power supply controller 10 and is configured to control the supply of power to a single venue 2 associated with the power supply controller 10. However in other arrangements, any number of power supply controllers 10 may be provided. Each of the power supply controllers may be associated with a different venue 2 and may be communicatively connected to the booking controller 110 in the same way as the power supply controller 10 described above in order to request and receive power supply information. In this way, the power supply control system 100 may be configured to control the supply of power to a plurality of venues according to the third party booking information stored by the memory module 112.

In some arrangements, when the power supply control system 100 comprises a plurality of power supply controllers 10, more than one of the power supply controllers 10, or the components comprised in more than one power supply controllers, may be co-located, e.g. within a single housing.

In such arrangements, the more than one power supply controllers 10 may be located within one venue 2 and may control the supply of power to a plurality of venues, e.g. each of the venues corresponding to one of the power supply controllers. Alternatively, the more than one power supply controllers may be located outside of the venues, e.g. within a building or complex in which the venues are located.

Furthermore, in such arrangements the communication modules 12 of the more than one power supply controllers 10 may be communicatively coupled to a common communication link 50. Alternatively, the communication modules 12 of the more than one power supply controllers 10 may be communicatively coupled to individual, e.g. separate, communication links 50.

In a similar way, the one or more high voltage contactors 18 of the different power supply controllers 10 may be coupled to a common electrical supply line 40, or may be coupled to individual, e.g. separate, electrical supply lines.

When a particular power supply controller 10 configured to control the supply of power to a particular venue is not located within the particular venue, the occupant notification module 15 and/or the user interface 17 corresponding to the particular venue may be separate from the power supply controller 10 and may be located within the venue.

Figure 3:
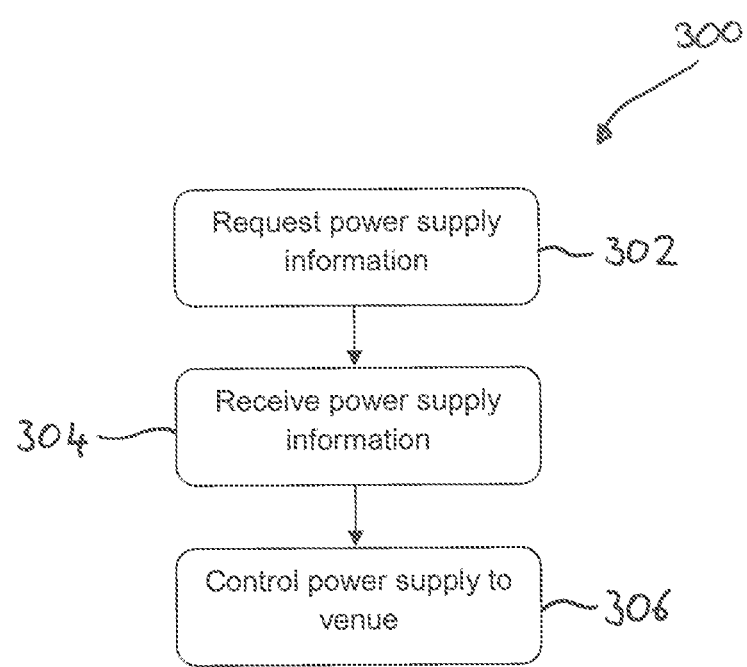
FIG. 3 is a flow chart illustrating a method of supplying power to a venue according to arrangements of the present disclosure.

With reference to FIG. 3, the power supply control system 100 may operate to control the supply of power to one or more venues 2 according to a method 300. The method 300 comprises a first step 302, in which power supply information is requested by the power supply controller of a particular venue 2 from the booking controller. As mentioned above, the power supply controller 10 may request the power supply information by transmitting identification information, e.g. a unique identification number, identifying the particular venue 2 or the particular power supply controller 10 to the booking controller 110.

The power supply information to be provided to the power supply controller 10 is determined by the booking controller 110. The power supply information may be determined by referring to third party booking information stored by the memory module of the booking controller 110 that corresponds to the particular venue and/or power supply controller requesting the power supply information.

The power supply information may be transmitted to the power supply controller 10 by the booking controller 110, e.g. via the communication link 50. The power supply information may be transmitted to the power supply controller 10 that the power supply information relates to. Alternatively, the power supply information may be transmitted to each of the power supply controllers together with the identification information.

The method 300 may comprises a second step 304 in which the power supply information is received at the power supply controller or controllers. If the power supply information is sent to each of the power supply controllers 10 within the power supply control system and includes identification information, the power supply controllers determine whether to control their operation according to the received power supply information based on the identification information.

The method 300 further comprises a third step 306, in which the supply of power to the venue 2 is controlled, e.g. according to the received power supply information. The supply of power to the venue may be controlled in response to receiving the power supply information, e.g. if the power supply information differs from the power supply information received previously.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

What is claimed is:

1. A power supply controller for selectively providing power to a venue, wherein the power supply controller comprises one or more modules configured to:
   communicate with a booking controller located remotely from the venue to request power supply information; and
   control the supply of power to the venue on receiving the power supply information in response to the request,
   wherein the power supply controller is configured to request the power supply information repeatedly at a predetermined frequency.

2. The power supply controller of claim 1, wherein the power supply controller is further configured to transmit information identifying the venue to the booking controller in order to request the power supply information.

3. The power supply controller of claim 1, wherein the power supply controller is configured to supply power to a first group of electrical devices at the venue when the power supply information indicates that power should be supplied or that power should be supplied within a first period of time.

4. The power supply controller of claim 1, wherein the power supply controller is configured to supply power to a second group of electrical devices only when the power supply information indicates that power should currently be supplied.

5. The power supply controller of claim 1, wherein the power supply controller is configured to continue supplying power to a third group of electrical devices after the power supply information indicates that power should no longer be supplied.

6. The power supply controller of claim 1, wherein the power supply controller is configured to stop supplying power to a fourth group of electrical devices when the power supply information indicates that power should no longer be supplied.

7. The power supply controller of claim 1, wherein the power supply controller further comprises a low voltage circuit and a high voltage contactor controllable by the low voltage circuit to supply electrical power to the venue.

8. The power supply controller of claim 1, wherein the power supply controller further comprises an occupant sensor configured to determine whether one or more occupants are at the venue, wherein the power supply controller is configured to control the supply of electrical power based on the power supply information and whether one or more occupants are at the venue.

9. The power supply controller of claim 1, wherein the power supply controller is further configured to control access to the venue based on the power supply information.

10. The power supply controller of claim 1, wherein the power supply controller is configured to supply power to the venue if no power supply information is received from the booking controller.

11. The power supply controller of claim 1, wherein the power supply controller is configured to notify occupant at the venue when the power supply information indicates that power should no longer be supplied after a further predetermined period of time has elapsed.

12. The power supply controller of claim 1, wherein the power supply controller is configured to stop supplying power to a plurality of electrical devices at the venue in a predetermined shut down order when the power supply information indicates that power should no longer be supplied.

13. The power supply controller of claim 1, wherein the venue is a recording studio or rehearsal space and wherein the electrical devices at the venue comprise one or more audio production and/or recording devices.

14. A booking controller comprising one or more modules configured to:

store third party booking information relating to one or more venues within a memory associated with the booking controller;

receive a request for power supply information from a power supply controller at one of the venues;

determine, based on the third party booking information, whether power should be supplied to electrical devices at the one of the venues; and transmit power supply information to the power supply controller, the power supply information indicating whether power should be supplied, wherein the booking controller is configured to receive the request for power supply information from a power supply controller repeatedly at a predetermined frequency and transmit the power supply information to the power supply controller in response to the request received repeatedly at a predetermined frequency.

15. The booking controller of claim 14, wherein the booking controller is configured to receive a venue booking request from a third party and store third party booking information corresponding to the venue booking request.

16. A power supply control system comprising:

a power supply controller configured to selectively supply electrical power to a venue, wherein the power supply controller includes one or more modules configured to (1) communicate with a booking controller located remotely from the venue to request power supply information, and (2) control the supply of power to the venue on receiving the power supply information in response to the request, wherein the power supply controller is configured to request the power supply information repeatedly at a predetermined frequency; and a booking controller located remotely from the venue, the booking controller configured to maintain third party booking information, wherein the power supply controller is configured to control the supply of electrical power based on the third party booking information.

17. The power supply control system of claim 16, wherein the system further comprises a further power supply controller configured to selectively supply electrical power to a further venue, wherein the further power supply controller is configured to control the supply of electrical power to electrical devices at the further venue based on the third party booking information.

* * * * *